United States Patent [19]
Matsumoto et al.

[11] 3,741,644
[45] June 26, 1973

[54] ORIGINAL POSITION CONFIRMING MEANS FOR DUPLICATING APPARATUS

[75] Inventors: Seiji Matsumoto, Asaka; Satoru Honjo, Tokyo, both of Japan; Masamichi Sato, Urbana, Ill.; Osamu Fukushima, Setagava-ku, Tokyo, Japan

[73] Assignee: Xerox Corporation, Stamford, Conn.

[22] Filed: Jan. 14, 1972

[21] Appl. No.: 217,732

[52] U.S. Cl. .................................. 355/40, 355/59
[51] Int. Cl. ......................................... G03b 27/52
[58] Field of Search ............................... 355/40, 59

[56] References Cited
UNITED STATES PATENTS
2,428,627  10/1947  Kalman .......................... 355/59 X
3,290,989  12/1966  Beattie et al. ..................... 355/59 X

*Primary Examiner*—Samuel S. Matthews
*Assistant Examiner*—Richard A. Wintercorn
*Attorney*—James J. Ralabate, Terry J. Anderson et al.

[57] ABSTRACT

Apparatus is disclosed for use in aiding an operator to accurately position an original to be reproduced in registration with the aperture and transparent platen in a reproducing system. The disclosed apparatus includes an auxiliary light source which is disposed in a position apart from the path of projection of the optical system of the reproducing apparatus and illumination from the auxiliary light source is directed onto an area of the original to indicate the relative positioning between the original and the reproducing system.

3 Claims, 3 Drawing Figures

PATENTED JUN 26 1973

ORIGINAL POSITION CONFIRMING MEANS FOR DUPLICATING APPARATUS

BACKGROUND OF THE INVENTION

This invention relates generally to reproducing apparatus and more particularly to an arrangement for correctly positioning an original to be produced in registration with the optical system of the reproducing apparatus.

To obtain copies of originals such as characters or drawings printed or drawn on opaque supports such as paper sheet or flat board or pictures, it is convenient to illuminate the original to be duplicated and focus the light reflected from the original through an optical system such as a lens on a photosensitive medium. This permits obtaining high-quality copies.

In such type of duplicating apparatus, it is desirable to hold the original on a support in a predetermined position and at a predetermined distance with respect to the photosensitive medium and optical system. Usually, these apparatus are provided with an original support made of a transparent glass plate, which is disposed in a predetermined position and against which the original is pressed. In holding the original on the original support, it is thought better if the original is directed downwardly from the standpoints of copying work and the construction of the duplicating apparatus.

However, when the original is placed on the original support such that it is directed downwardly, it is impossible to know what part of the original will be duplicated. In such case it is extremely difficult to correctly position the original to be copied within the duplicating apparatus. Particularly, this operation is difficult in xerographic duplicating apparatus, which utilizes very intensive illumination and in which the illuminating light is projected from behind the original support toward the operator.

If a view finder is to be provided to confirm the area of the original to be duplicated, it must be disposed in a position on the optical path from the illumination source to the photosensitive medium. Then, the apparatus inevitably becomes complicated and expensive. For this reason, no general purpose duplicating apparatus of this type is provided with any view finder.

SUMMARY OF THE INVENTION

Accordingly, it is a principal object of the present invention to overcome the inherent deficiencies in conventional duplicating apparatus by the provision of an arrangement for confirming whether the area of the original to be duplicated is correctly confined within a predetermined frame of the duplicating apparatus.

These and other objects of the invention are attained in a duplicating apparatus for duplicating originals which focuses light reflected from the original through a window formed in an original support and through an optical system onto a photosensitive medium. In the original position conforming means according to the invention, when placing an original on the original support, the area of the original to be duplicated is illuminated or the boundary of the area is indicated by means of an auxiliary light source, which directs light toward the surface of the original and is disposed in a position apart from the path of projection of the optical system.

Other objects of the invention will become readily apparent to those skilled in the art in view of the following detailed disclosure and description thereof, especially when read in conjunction with the accompanying drawings.

DESCRIPTION OF THE PREFERRED EMBODIMENTS

Figure 1:
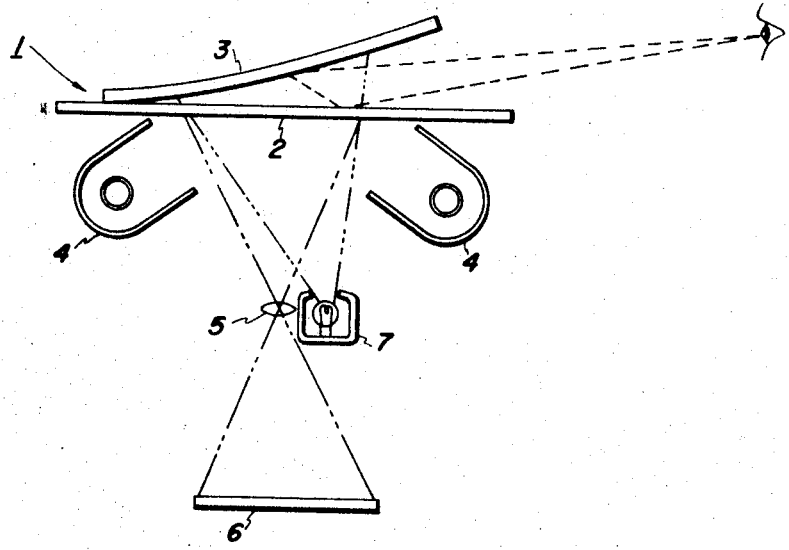
FIG. 1 is a schematic cross sectional illustration of a portion of a reproducing apparatus showing one embodiment as contemplated by the present invention.

Referring now to the drawings, reference numeral 1 designates an original support, reference numeral 2 designates a window formed in the original support, reference numeral 3 designates an original to be duplicated, which is to be laid on the original support with the original surface directed downward, reference numeral 4 designates light sources to illuminate the original, reference numeral 5 designates an optical system such as a lens, reference numeral 6 designates a photosensitive medium onto which light reflected from the original is focused through the optical system, and reference numeral 7 designates an auxiliary light source to illuminate a predetermined area of the original to be duplicated.

FIG. 1 of the drawing shows one embodiment of the invention. The original surface of the original 3 is to be laid over the window 2 formed in the original support 1 of the duplicating apparatus. The window may be provided with a transparent plate such as a glass plate, or it may be a mere aperture. The original surface of the original image 3 is illuminated from the light sources 4 when it is laid over the window 2, and the reflected light is focused through the optical system 5 such as a lens on the photosensitive medium 6.

In this embodiment, when laying the original 3 over the support 1, the original surface is inspected by holding the original 3 slightly tilted as is illustrated, light from the auxiliary light source 7 and penetrating the window 2 illuminates the corresponding area of the original 3, so that the area of the original surface to be duplicated may be confirmed.

Since the inspection of the original surface is made by holding the original tilted as is illustrated, the area of the tilted original surface illuminated by light from the auxiliary light source 7 and permitted through the window 2 may be made to precisely correspond to the area to be duplicated even by disposing the auxiliary light source in a position apart from the optical axis of projection at the time of focusing the light image.

The original surface illuminated from the auxiliary light source 7 may be inspected directly from a sidewise position as is illustrated. Alternatively, a light image reflected by the surface of the glass window 2 may be observed.

In order to ensure uniform illumination, it is of course preferable to turn on the auxiliary light source only for the purpose of positioning the original and hold it off during the duplicating process. When positioning the original, the main light sources 4 should be turned off. Also, it is preferable to arrange such that light from the auxiliary light source 7 is not directed to the observer.

In the preceding description, the window 2 is assumed to be constituted by a transparent glass plate mounted in an opaque support. If the support is made of a transparent glass plate, a frame drawn thereon may serve as the window. In such case, the frame is projected on the original surface, so that the positioning of the original may be further facilitated.

Figure 2:
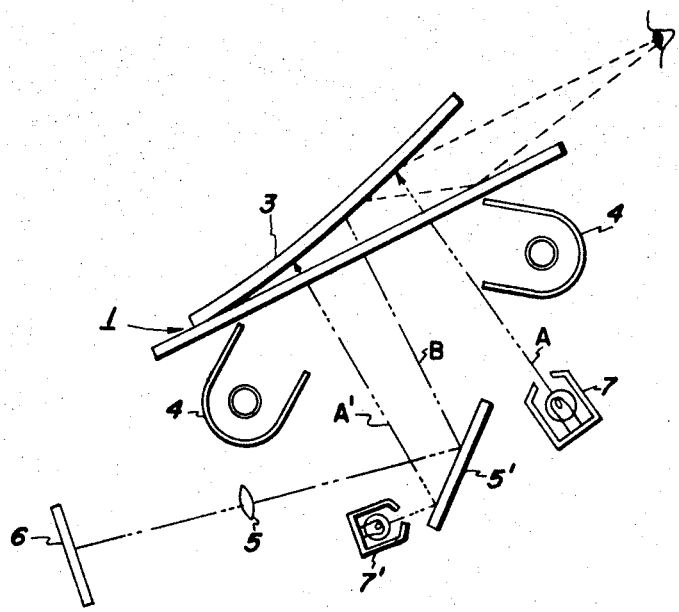
FIG. 2 is a schematic cross sectional illustration of a portion of a reproducing apparatus showing another embodiment as contemplated by the present invention.

FIG. 2 of the drawing shows another embodiment, in which the original support is not horizontal but is slanted to the end of facilitating the positioning of the original.

This embodiment is fundamentally the same as the preceding embodiment. In this embodiment, however, two auxiliary light sources are used for separately projecting the opposite edges of the window 2. Thus, even if the original image surface is considerably raised from the original support, the area to be duplicated may be fairly precisely indicated. Of course, one of the two auxiliary light sources may be replaced with a light guide to guide part of the light from the other.

In this embodiment, the inspection of the original surface tilted with respect to the original support may be made from a comparatively higher position, so that the positioning of the original may be further facilitated. Also, the directions A and A' of projection of light from the auxiliary light sources 7 and 7' can considerably deviate from the axis B of projection at the time of focusing the light image. Thus, a reflecting mirror 5' may be used for focusing the light image, which can augment the freedom in the design of the duplicating apparatus.

Figure 3:
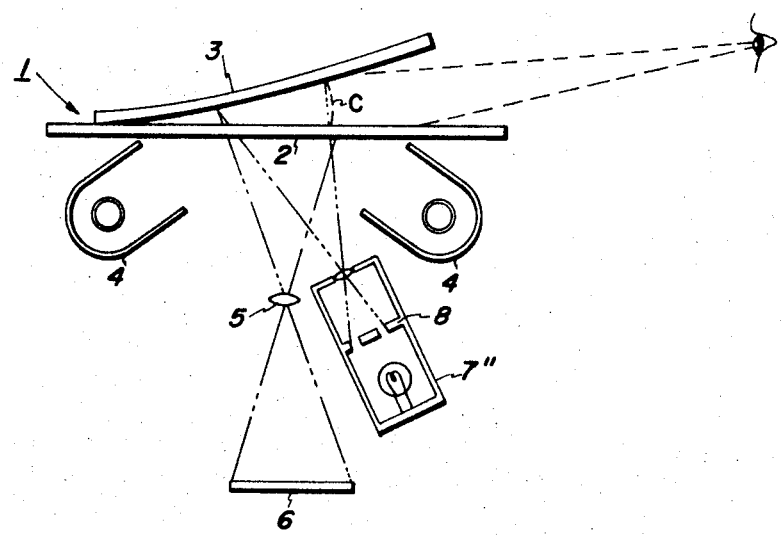
FIG. 3 is a schematic cross sectional illustration of a portion of a reproducing apparatus showing a further embodiment as contemplated by the present invention.

FIG. 3 of the drawing shows a further embodiment, in which the auxiliary light source 7' is provided with frame plate 8 to project a frame defining the area of the original to be duplicated.

In this embodiment, similar to the embodiment of FIG. 1, the frame of the area to be duplicated is defined by a point light source. In this case, the auxiliary light source should be disposed on the same side of the axis of the optical system as that edge of the tilted original which is raised from the original support 1. Also, the boundary of the flux of the projected light to define the area of the original to be duplicated should be as close to the arc C drawn when tilting the original as is possible.

As will be understood from the foregoing description, the positioning of a downward-facing opaque original can be carried out in accurate registration with the platen of a copying or reproducing apparatus with the aid of an auxiliary illuminating means as contemplated by the invention.

While the invention has been described with reference to preferred arrangements and embodiments, it will be generally understood by those skilled in the art that various changes may be made and equivalents may be substituted for elements thereof without departing from the true spirit and scope of the invention.

What is claimed is:

1. In a reproducing apparatus in which an original to be reproduced is placed on a transparent platen overlying a projection aperture and illuminated with an image reflecting light source to project the information pattern through an optical system onto the surface of a photosensitive material, apparatus for aiding an operator in accurately positioning the original to be reproduced in registration with the aperture and transparent platen comprising, auxiliary illumination means for illuminating at least a portion of the original to be reproduced during placement of the original onto said transparent platen, optical means operatively associated with said auxiliary illumination means for directing at least a portion of the illumination from said auxiliary illumination means through said aperture onto the surface of the original to be reproduced to illuminate the original to be reproduced in relation to said aperture, and means for energizing said auxiliary illumination means independent of the energization of said image reflecting light source to permit an operator to obtain a view of the original to be reproduced and accurately position the original in registration with the aperture and said platen before making a reproduction of the original image.

2. In a reproducing apparatus in which an original to be reproduced is placed on a transparent platen overlying a projection aperture and illuminated with an image reflecting light source to project the information pattern through an optical system onto the surface of a photosensitive material, apparatus for aiding an operator in accurately positioning the original to be reproduced in registration with the aperture and transparent platen comprising, an auxiliary light source for illuminating at least a portion of the original to be reproduced during placement of the original onto said transparent platen, optical means operatively associated with said auxiliary light source for directing at least a portion of the illumination from said auxiliary light source through said aperture onto the surface of the original to be reproduced to illuminate the original to be reproduced in relation to said aperture, and means for selectively energizing said auxiliary light source independent of the energization of said image reflecting light source to permit an operator to view an of the original to be reproduced and accurately position the original in registration with aperture and said platen before making a reproduction of the original image.

3. In a reproducing apparatus in which an original to be reproduced is placed on a transparent platen overlying a projection aperture and illuminated with an image reflecting light source to project the information pattern through an optical system onto the surface of a photosensitive material, apparatus for aiding an operator in accurately positioning the original image to be reproduced in registration with the aperture and transparent platen comprising, an auxiliary light source supported within said reproducing apparatus in substantially non-interfering relationship with the image projecting optical system of said reproducing apparatus for illuminating at least a portion of the original to be reproduced during placement of the original onto said transparent platen, optical means operatively associated with said auxiliary light source for directing at least a portion of the illumination from said auxiliary light source through said aperture onto the surface of the original to be reproduced to illuminate the original to be reproduced in relation to said aperture, and means for selectively energizing said auxiliary light source independent of the energization of said image reflecting light source to permit an operator to view an image to be produced and accurately position the original in registration with the aperture and said platen before making a reproduction of the original image.

* * * * *